March 6, 1945.    F. R. HARRIS    2,370,957
PREFABRICATED TIMBER DOCK
Filed Dec. 20, 1943    12 Sheets-Sheet 1

INVENTOR.
Frederic R. Harris
BY William F. Nickel
ATTORNEY

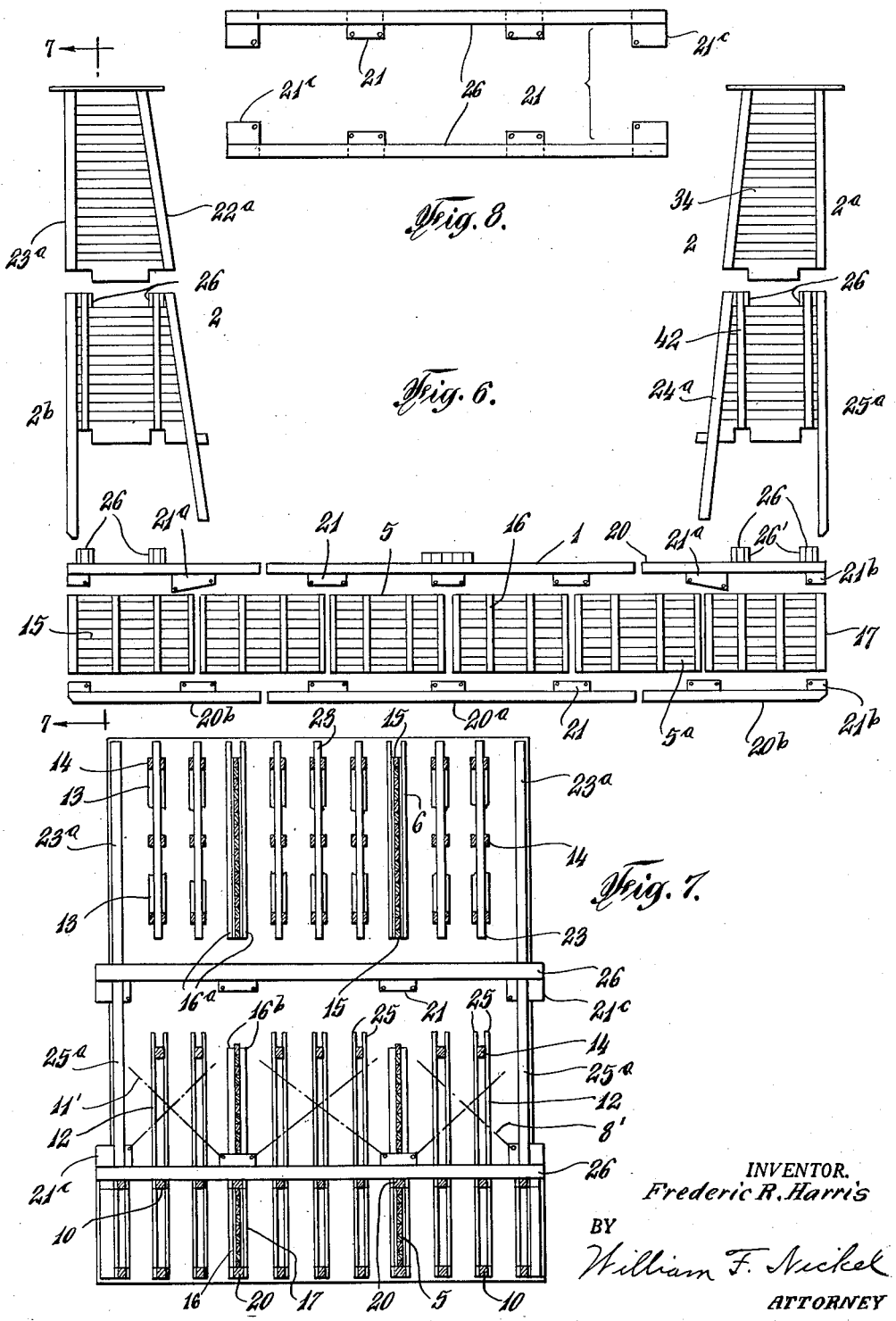

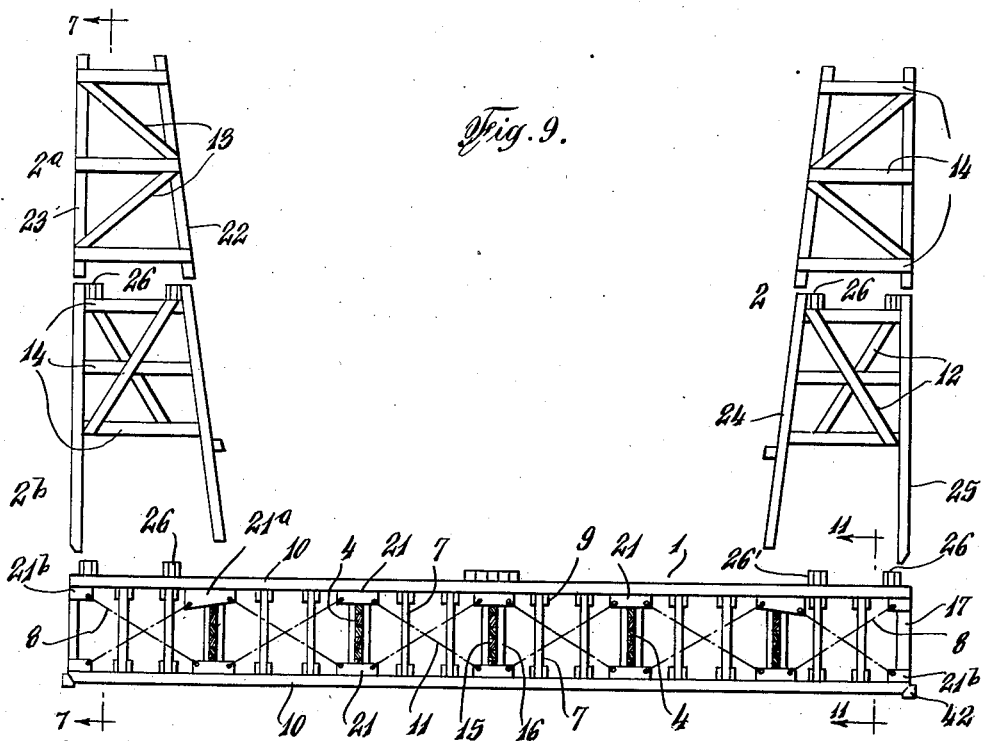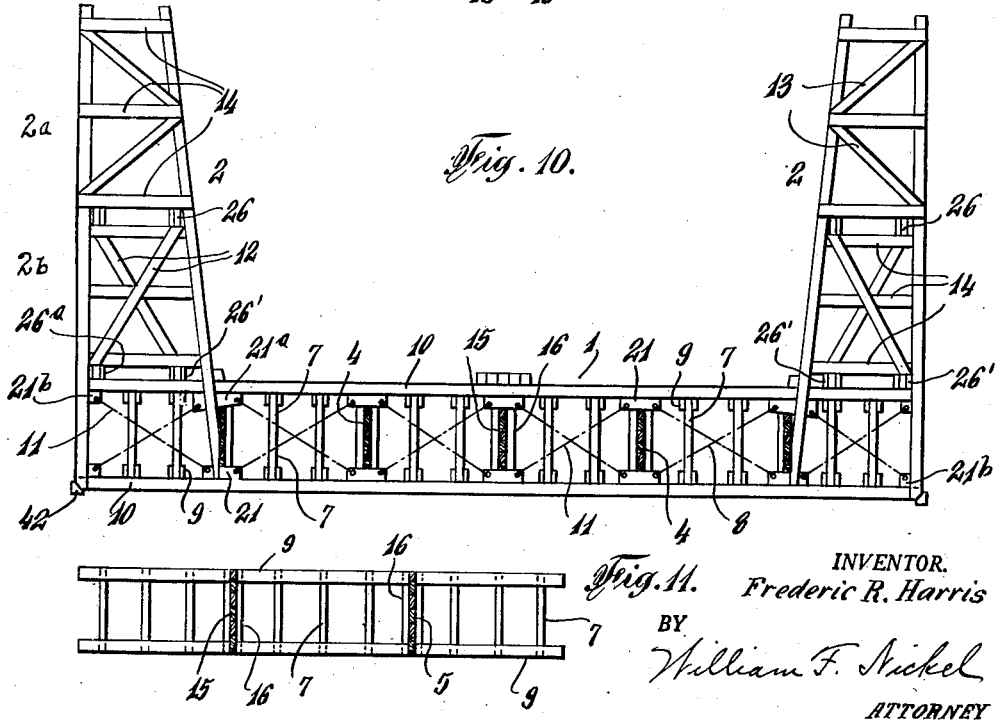

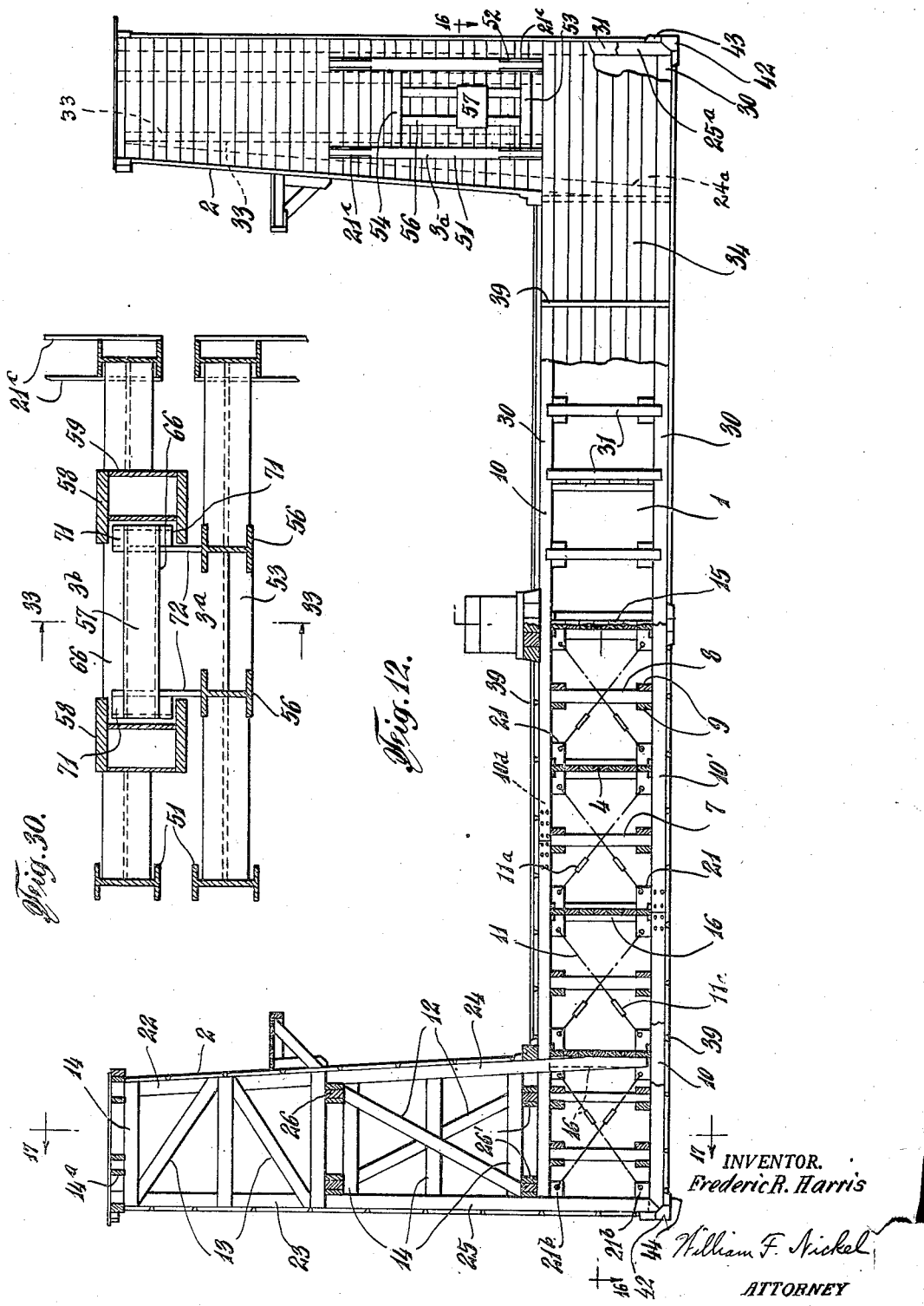

March 6, 1945. F. R. HARRIS 2,370,957
PREFABRICATED TIMBER DOCK
Filed Dec. 20, 1943 12 Sheets-Sheet 5
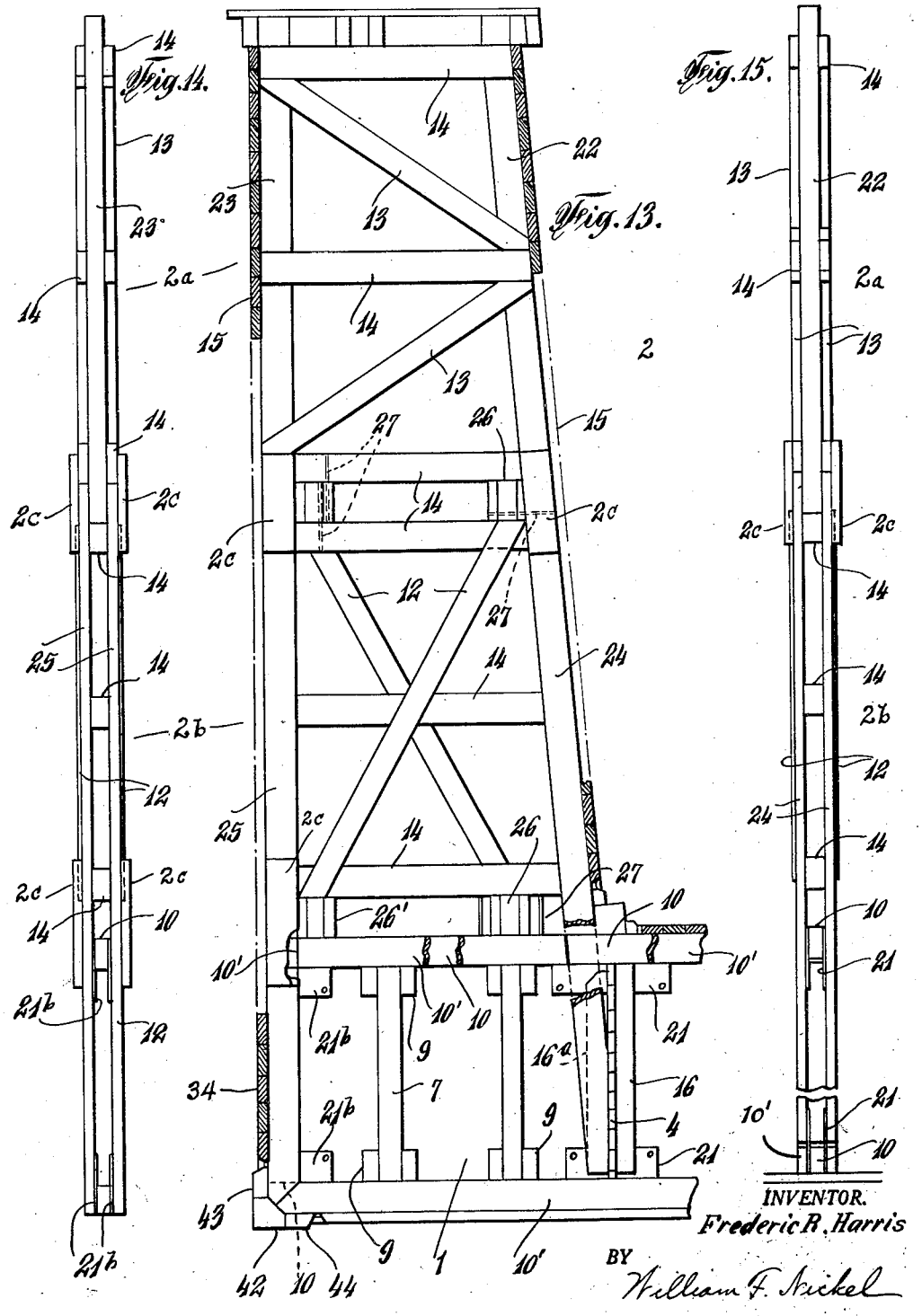
INVENTOR.
Frederic R. Harris
BY
William F. Nickel
ATTORNEY

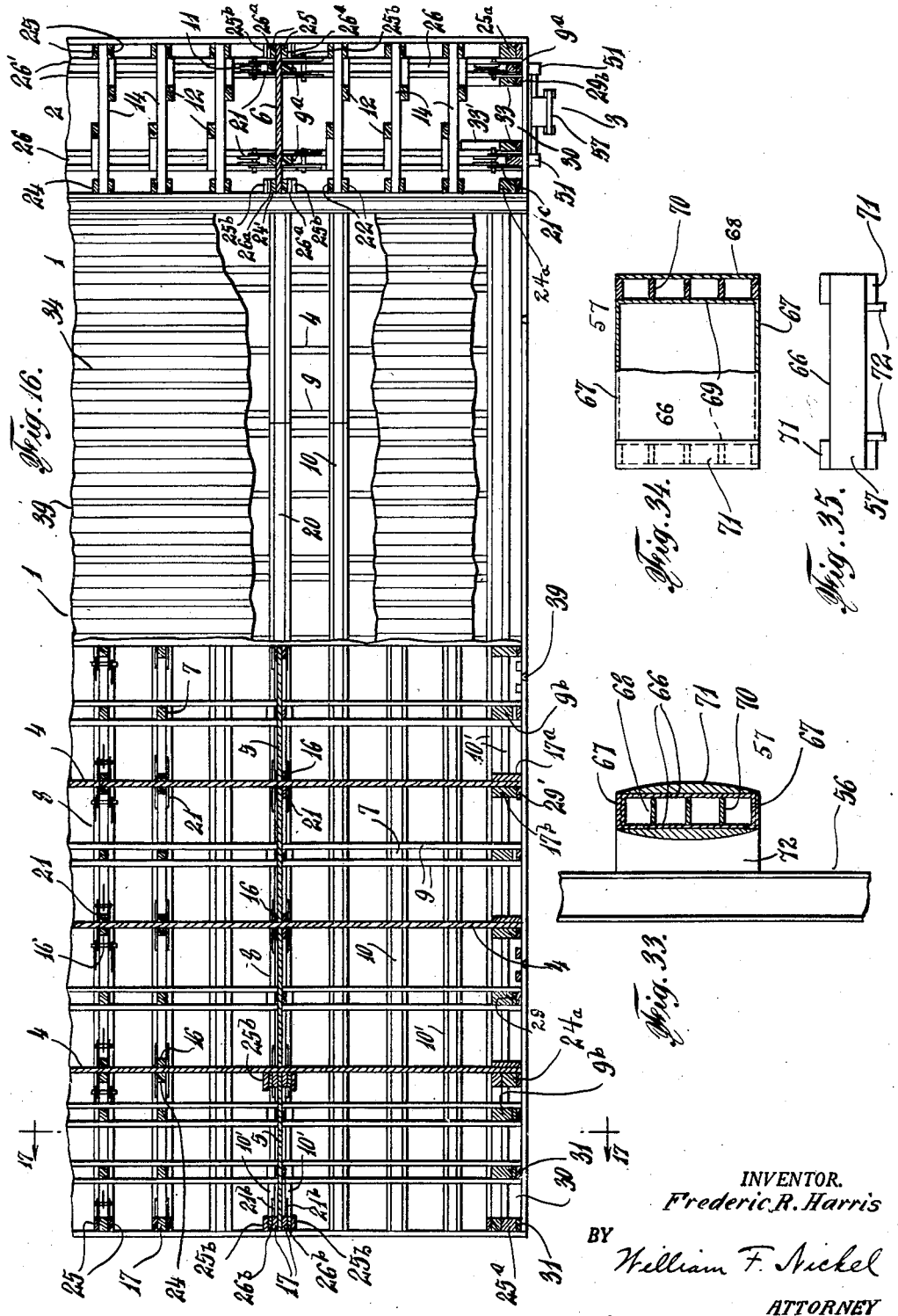

March 6, 1945. F. R. HARRIS 2,370,957
PREFABRICATED TIMBER DOCK
Filed Dec. 20, 1943 12 Sheets-Sheet 7
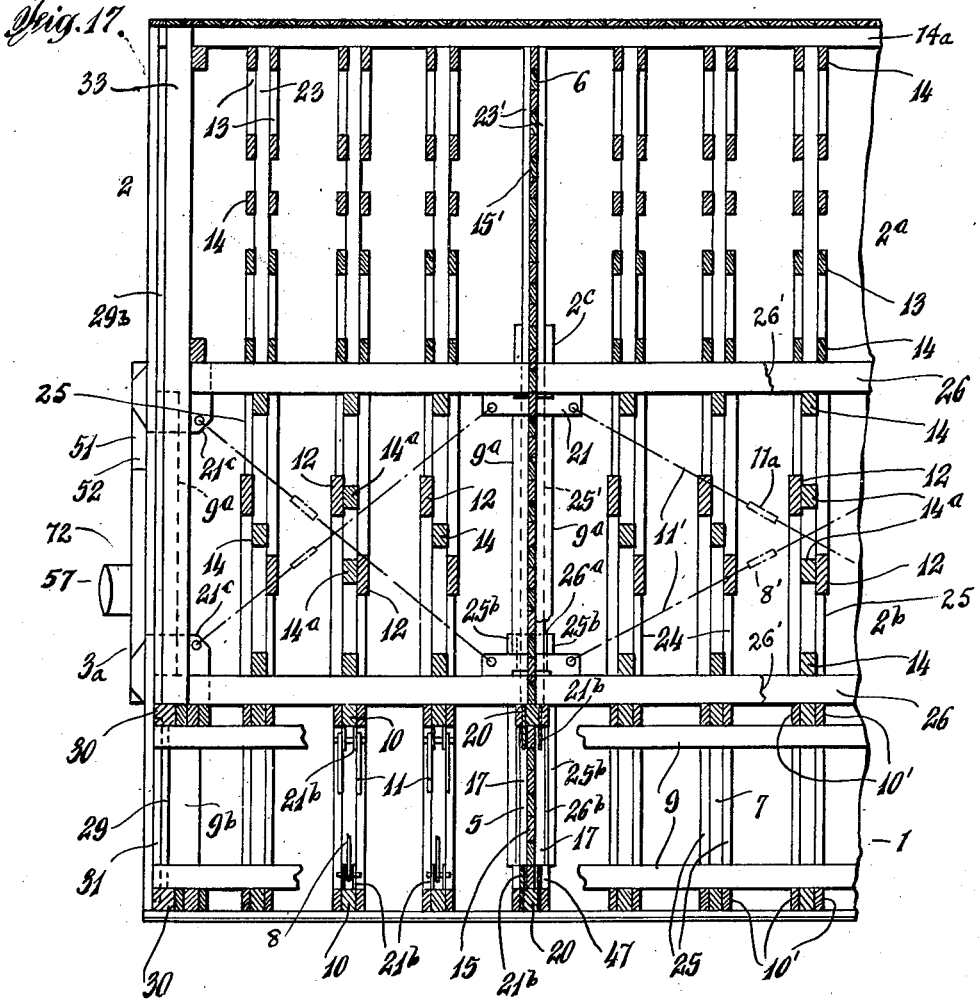
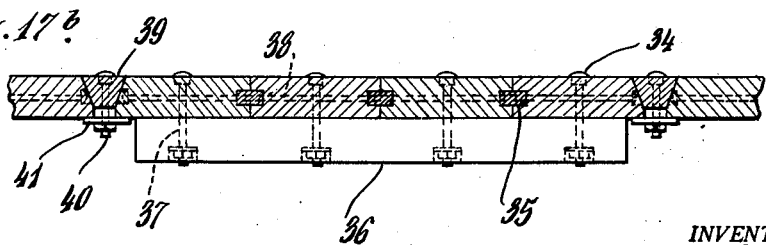
INVENTOR.
Frederic R. Harris
BY
William F. Nickel
ATTORNEY

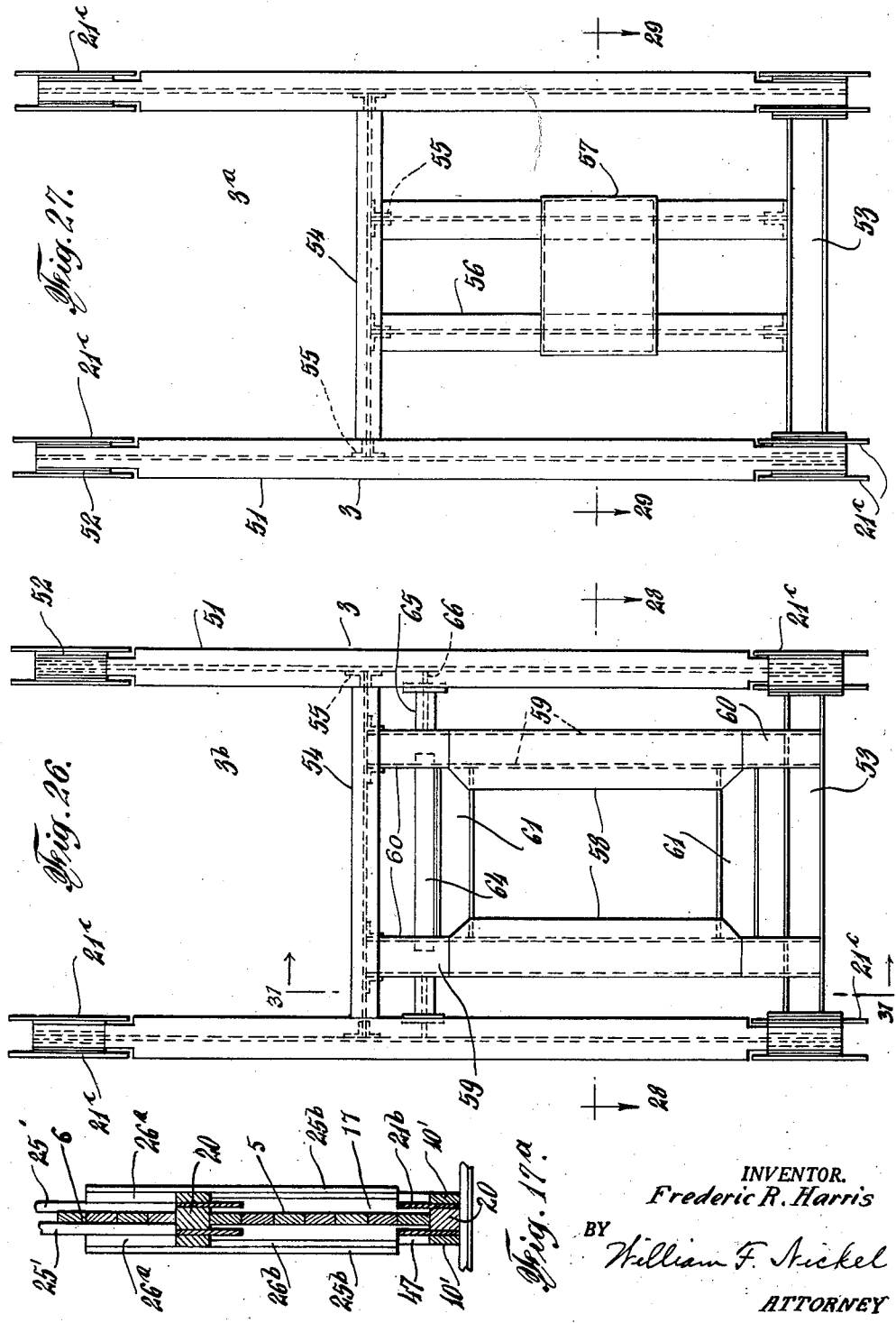

March 6, 1945.    F. R. HARRIS    2,370,957
PREFABRICATED TIMBER DOCK
Filed Dec. 20, 1943    12 Sheets-Sheet 9
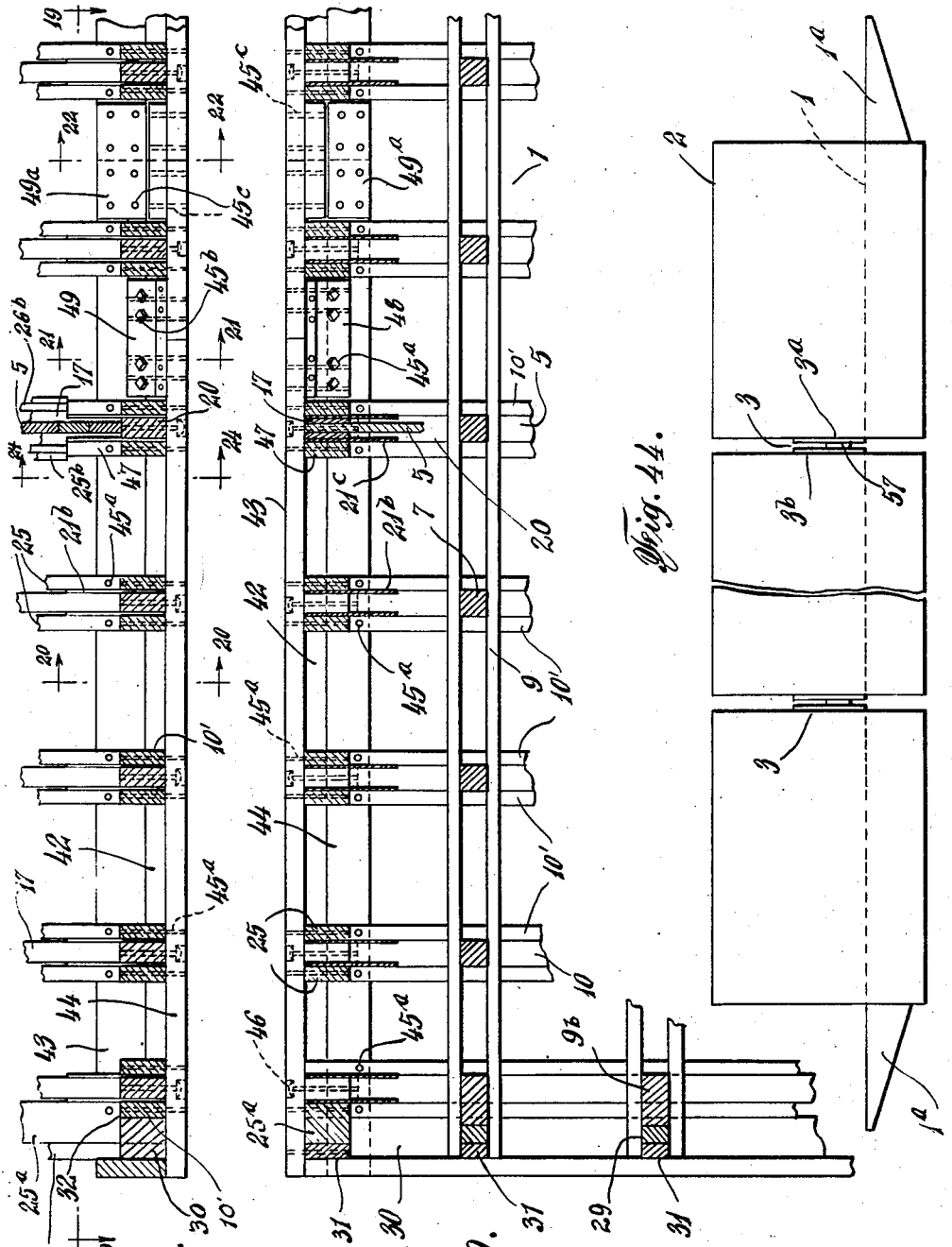
INVENTOR.
Frederic R. Harris
BY William F. Nickel
ATTORNEY

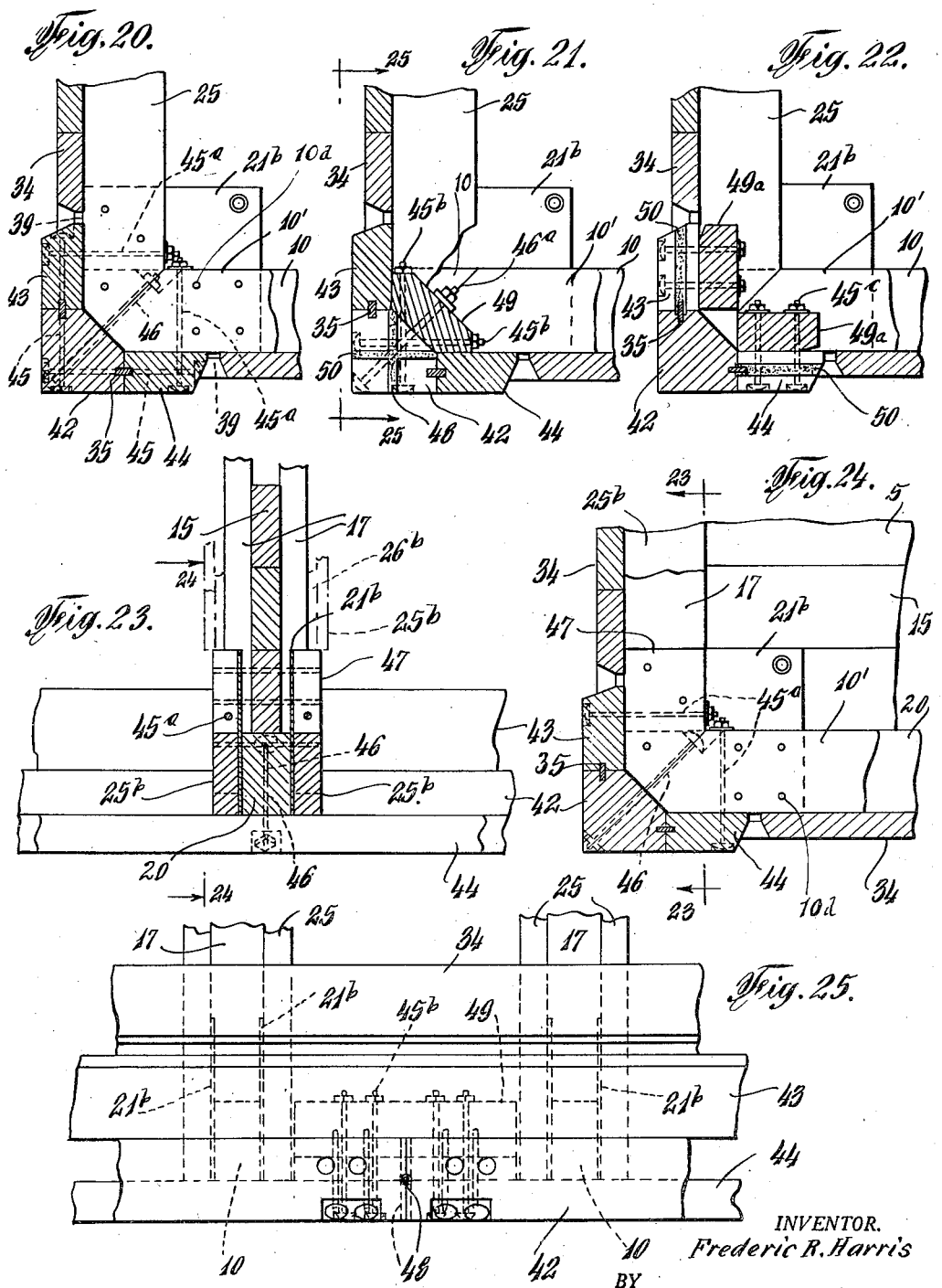

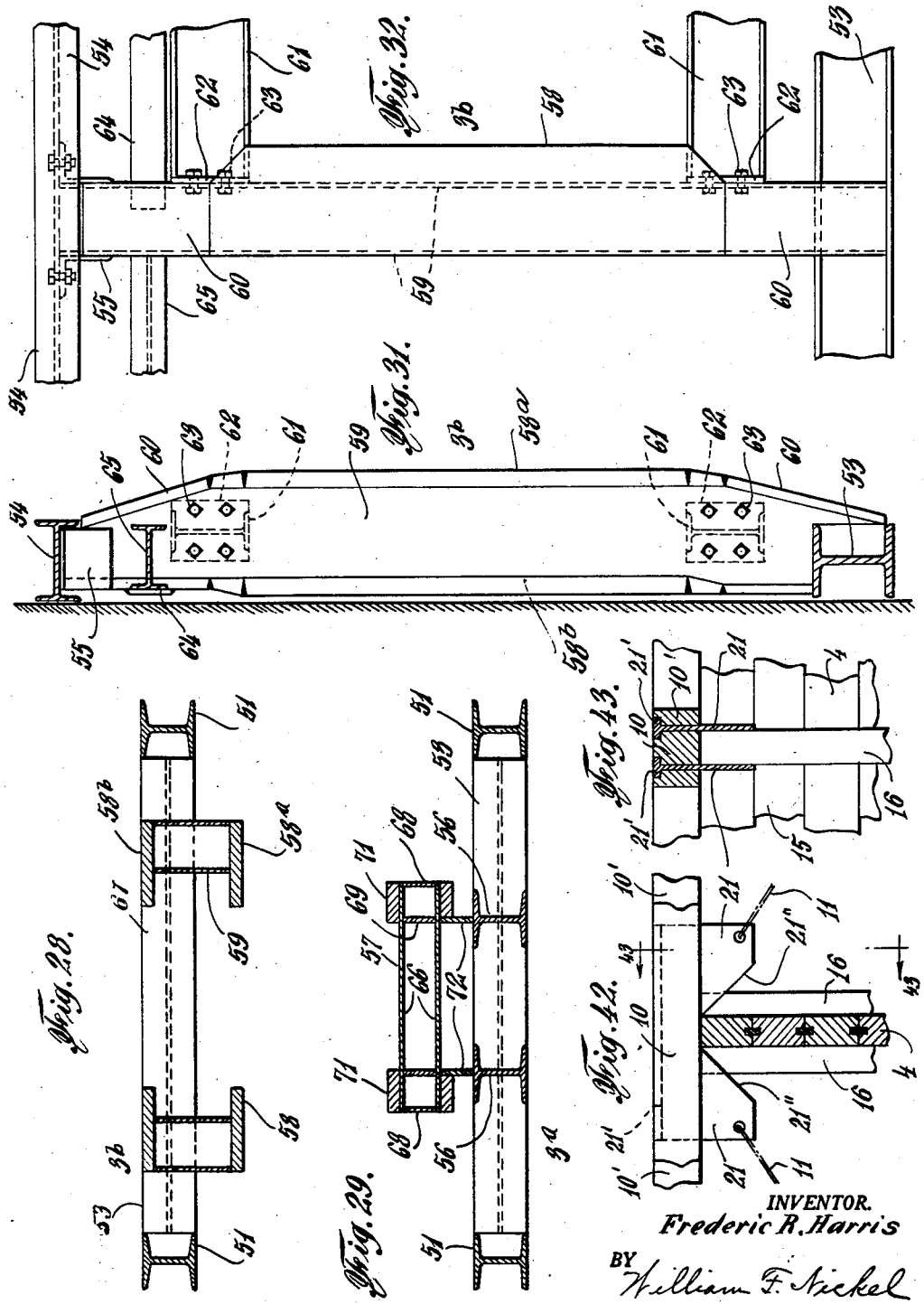

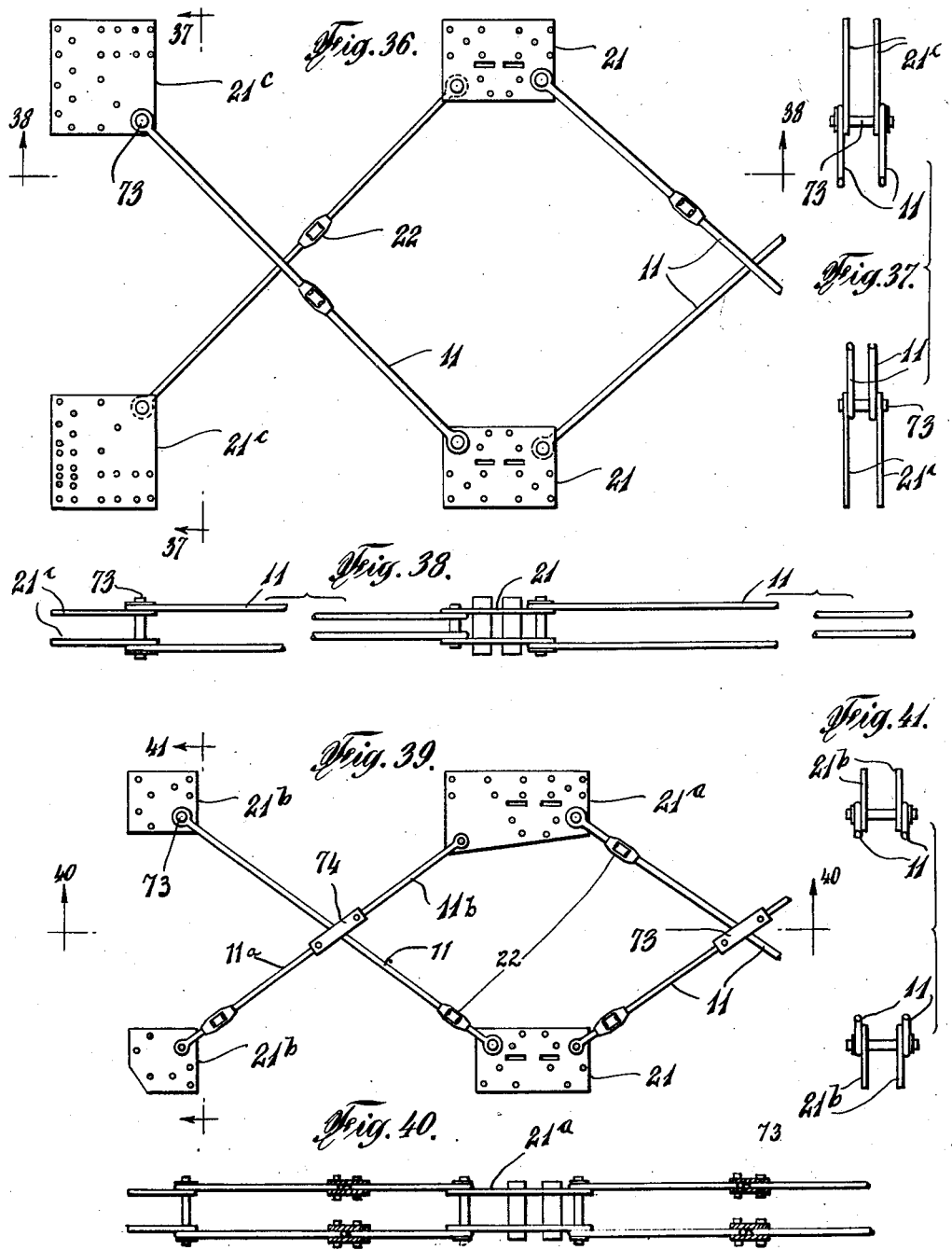

Patented Mar. 6, 1945

2,370,957

UNITED STATES PATENT OFFICE 2,370,957

PREFABRICATED TIMBER DOCK

Frederic R. Harris, New York, N. Y.

Application December 20, 1943, Serial No. 514,952

26 Claims. (Cl. 114—46)

This invention relates to improvements in floating dry docks, particularly dry docks of timber or other materials, designed and built in sections and adapted to be set up in the form of separate and distinct units, which can easily be coupled to make the dock complete and ready for use.

An important object of the invention is to facilitate the building of a floating dry dock with bulkheads, beams, posts and braces, which can readily be joined to make a pontoon; and other parts to be put into place and united to make the portions of the walls which are reared on the pontoons or hulls. When the pontoons and the portions of the walls thereon are finished, the units are attached to one another by suitable coupling devices to maintain the pontoons and the wall portions in effective alignment; and thus produce a larger or smaller dock having more or fewer units, according to the size and capacity required.

It is also an object of the invention to design a dock comprising members and sections which can easily be shipped and otherwise handled, so that the dock can easily be constructed and finished on or near the site of intended use.

Another object of the invention is to provide a floating dry dock with the wing or side walls of such construction that the sections thereof for each unit can quickly be given shape and secured to the pontoons or hulls which carry them.

A further object is to provide a novel and efficient type of coupling by which the different units of the dock can be operatively attached to one another, and conveniently disconnected whenever necessary to repair, scrape or paint any part of the dry dock.

An additional object is to provide efficient means for strengthening and bracing the various bulkheads, beams, uprights and other members of the framework of the dock.

With these and other objects and advantages, which will appear as the description proceeds, the invention resides in the features and combinations defined and pointed out; but the embodiment illustrated and set forth is presented as an example only, and others may be adopted in practice to the full extent consistent with the broad and general meanings of the terms in which the appended claims are expressed.

On said drawings:

Figure 6 shows schematically in side elevation how the transverse bulkheads of the pontoon and of the side walls of the dock are made up in sections prior to assembling.

Figure 7 is a section on line 7—7 of Figures 6 and 9 to show the plan of construction of the framework for the lengths of wing or side walls of each unit and the positions of the parts when assembling begins.

Figure 8 is a side view of the chords or beams for the trusses in the wing walls.

Figure 9 is an end elevation of the timber framework for the side walls, showing also a side view of one of the transverse trusses of the pontoon, with the wing wall sections ready to be set into place.

Figure 10 shows the same parts in position after assembling.

Figure 11 shows the transverse bulkheads in end view, and the longitudinal stringers or clamp timbers for the upper and lower ends of the intermediate posts; this view being a section on line 11—11 of Figure 9.

Figure 12 shows more fully in an end elevation one unit of the dock with one coupling member on the end of the length of the wing wall for connecting one unit to another, and the timber framework and trusswork of the side walls and pontoon, respectively.

Figures 13, 14 and 15 are respectively a side, a back and a front elevation of one of the frames of the wall portions for one of the units of the dock.

Figure 16 is a section on the plane shown by the line 16—16 on Figure 12.

Figure 17 is a vertical section in the plane of the line 17—17 in Figure 16, to show the side wall framework.

Figure 17a shows a detail of the pontoon and wall bulkhead construction, in a plane nearer to the side of the hull than in Figure 17.

Figure 17b is a transverse section through the outside planking of the dock.

Figure 18 is a side view in part of corner log and side planking for each side of a dock unit at the bottom, as seen from a point in a vertical plane parallel to the side, and just within the hull.

Figure 19 is a horizontal section on line 19—19 of Figure 18.

Figures 20, 21 and 22 are vertical sections taken on lines 20—20, 21—21, and 22—22 of Figure 18.

Figure 23 is a vertical section on line 23—23 of Figure 24.

Figure 24 is a section on line 24—24 of Figures 18 and 23.

Figure 25 is a detailed side view of corner log and side planking showing part of the structure of Figure 18, seen from the plane of line 25—25 of Figure 21.

Figures 26 and 27 are front elevations of complementary engaging parts or members of the coupling device for the units of the dock; one part to be mounted on one unit, and the other upon an adjacent unit.

Figures 28 and 29 are horizontal sections on lines 28—28 and 29—29 of Figures 26 and 27 respectively.

Figure 30 (above Figure 12) shows the coupling members of Figures 26, 27, 28 and 29 in connecting position.

Figure 31 is a section on line 31—31 of Figure 26.

Figure 32 is a front view of the structure appearing in Figure 31, showing one side only.

Figure 33 is a vertical section on line 33—33 of Figure 30, through the coupling head.

Figures 34 and 35 are respectively a front view and a top view of the coupling head.

Figure 36 is a side view, in part, of the braces and connections in the trusswork for the wing walls.

Figures 37 and 38 are end and top views, in part of a wing wall truss, respectively, as viewed from lines 37—37 and 38—38 respectively on Figure 36.

Figure 39 is a side view of part of the pontoon trusswork.

Figures 40 and 41 are respectively top and end views in part of what is shown in Figure 39, as viewed from lines 40—40 and 41—41 respectively on Figure 39.

Figures 42 and 43 are side and sectional views on line 43—43 of Figure 42 respectively of a modified form of metal anchor or plates for the trusses; and Figure 44 is a side elevation on a smaller scale of the assembled dock.

The same numerals identify the same parts throughout.

Figure 1:
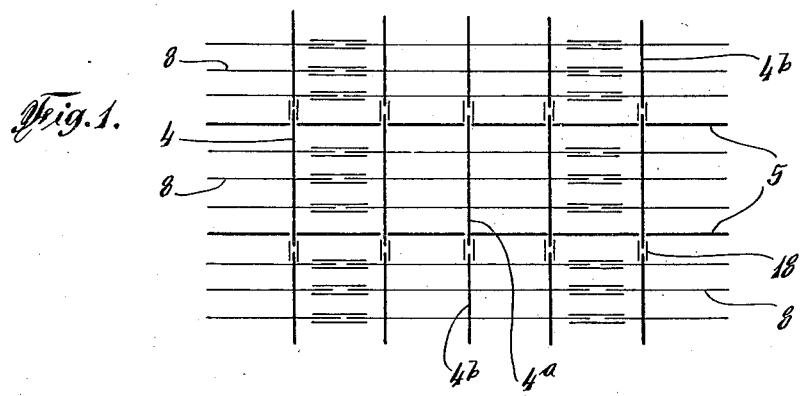
Figure 1 is a diagram in plan view showing the position of the parts of the framework, such as the bulkheads and trusses on the interior of a pontoon or hull of one of the units of the dock.
Figure 2:
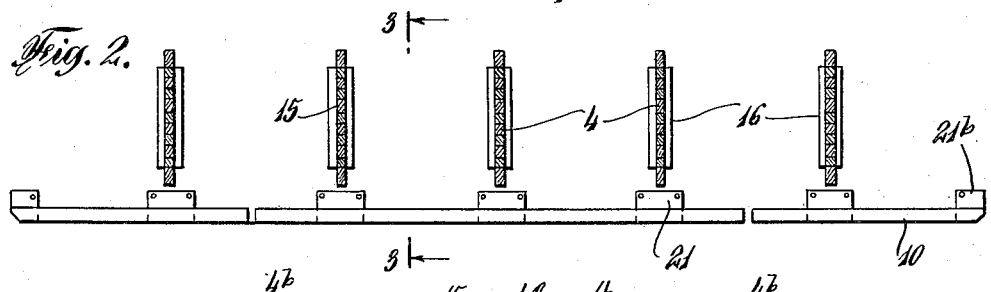
Figure 2 is a transverse sectional view showing the longitudinal bulkheads of the pontoon and one of the transverse beams or chords to be affixed thereto.
Figure 3:
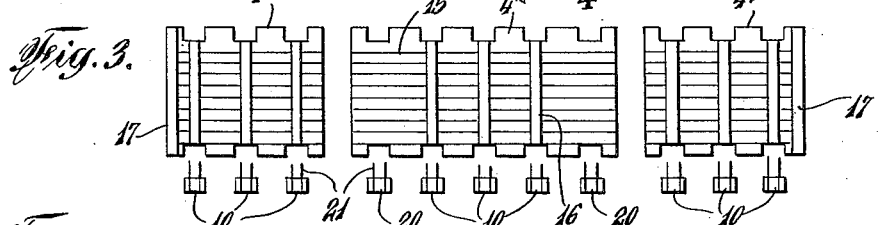
Figure 3 is a section on line 3—3 of Figure 2; showing how the longitudinal bulkheads are made in sections.
Figure 4:
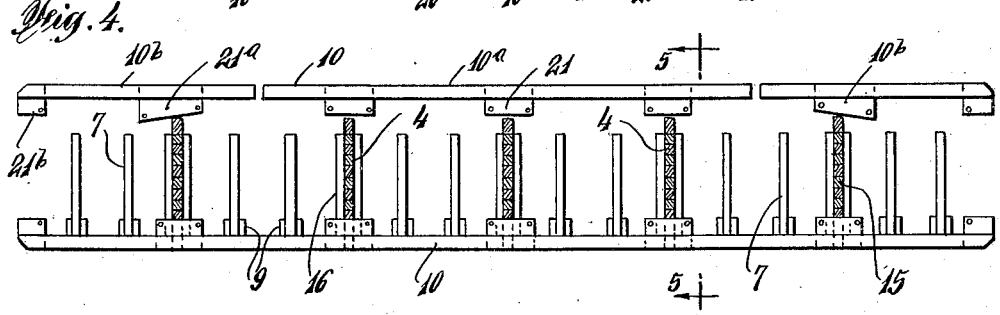
Figure 4 is a view similar to Figure 2, showing transverse beams for both tops and bottoms of the longitudinal bulkheads and posts between the latter.
Figure 5:
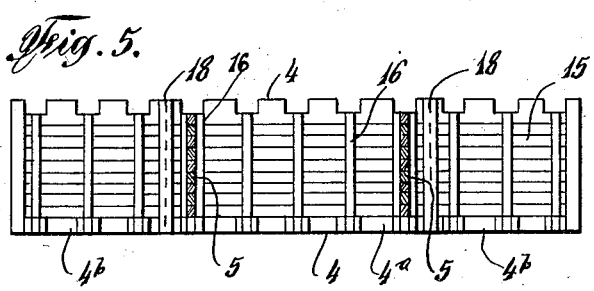
Figure 5 is a section on line 5—5 of Figure 4 and shows in side elevation the sections of one such bulkhead assembled and the relative positions of the transverse bulkheads, as seen from one end of the latter.

In the following detailed description, reference is first made to Figures 1 to 11 inclusive. These views are somewhat diagrammatic, but show the principal parts of each dock unit and the arrangement thereof; the particular features of construction appear more fully in the remaining views.

Each dry dock unit comprises a pontoon having a hull 1 with portions of side walls 2 at each of its shorter sides or ends. By joining several such units with the portions of the walls 2 arranged end to end, in alignment along each side, a complete dock is produced. The couplings indicated at 3 (Figure 44) on the ends of the portions of the side walls unite the various units to one another.

The hull 1 of each pontoon unit contains bulkheads 4, running in the direction of the length of the assembled dock and parallel with the side walls, and transverse bulkheads 5. (See Figure 1.) In the same vertical planes as the latter are the wall bulkheads 6. (See Figure 7.) In the spaces or compartments defined by the bulkheads 4 and 5 are rows of vertical posts 7 in trusses 8, the latter crossing the bulkheads 4 and being parallel to the bulkheads 5. On each side of the posts 7 of each row at top and bottom are clamping plank stringers 9 parallel to the bulkheads 4. Similarly, each of the trusses 8 includes a pair of top and bottom timbers 10, forming chords or beams, connected by diagonal crossed brace rods 11, the details of which will be later described, rigidly secured at their ends to the timbers 10 at various points. The deck and bottom timbers 10 respectively, run over and under the stringers 9. There is also a pair of trusses 8' in the lower half or section 2b of each length of side wall 2, extending parallel to the bulkheads 4; these trusses including diagonal brace rods 11'. The upper half or section 2a of each length of side wall also contains diagonal braces 13, connecting rows of uprights at the inner and outer faces thereof; and in each lower section 2b are diagonal braces 12.

Each portion of a side wall for the various units thus consists of two sections, the parts of which are joined to build the sections separately. The sections are then set up one on the other, at the two sides of each pontoon, as seen in Figures 6, 9 and 10. Cooperating with the diagonals 12 and 13 at their upper and lower ends and diagonals 13 at the middle, are horizontal braces 14, each approximately equal in length to the thickness of the wall at the level or height of its own position, to join the inner and outer uprights of the side wall sections 2a and 2b.

The longitudinal bulkheads 4 are produced in parts or sections, 4a at the center and 4b at the ends. Each part 4a is longer than the width of the space between the bulkheads 5. Each of said sections is made of horizontal planking 15, with vertical reinforcing posts 16 secured on both faces. The ends 4b also have upright reinforcing posts 17 placed to be at the extremities of the bulkheads 4. The ends 4b are joined to the central part 4a adjacent the bulkheads 5 by splice plates 18 fastened on both faces of the planking 15 by bolts or other suitable means. The bulkheads 5 are also made in parts or sections 5a (Figure 6), which are set up in line and joined to the center parts 4a of bulkheads 4 near the ends of the parts 4a. (See Figure 5.) The various parts 5a of each bulkhead 5 also include horizontal timber planking 15 and vertical reinforcing posts 16, with terminal posts 17 at one end of two of said parts, located so as to be at the extremities of the bulkhead 5. To fasten the bulkheads 4 and 5 together at the intersections, the posts or reinforcements 16 affixed to the ends of the sections 5a can be bolted or otherwise secured to the sections 4a; or any suitable additional fastening means may be employed.

At the top and bottom of the bulkheads 5 are timbers 20 forming chords or beams therefor. These beams are shown in three parts, one center 20a and two ends 20b, which "break" joint with the bulkhead sections 5a. The center parts have three pairs of plates 21 side by side, each long enough and in position to receive between the plates of each pair the planking of the bulkhead 5 at the adjacent ends of all parts or sections 5a thereof, spanned by this center section 20a. These plates are set into slots in the chords or beams, or otherwise mounted; and recesses are provided between the top and bottom planks of the bulkhead sections 5a and the ends of all posts or reinforcements 16 to enable the plates to engage the planking snugly.

The upper parts or beam sections 20b have large plates 21a at points below the inner faces of the side walls, to bridge the inner extremities of the bulkhead terminal parts 5a, and the near ends of the adjacent sections or parts 5a; while the lower parts 20b at these points have plates like the plates 21. The chords or beams also carry smaller plates 21b at the outer extremities of the end sections 20b. These plates 21b may fit between the planking of the bulkheads and the end posts 17; the extremities of which, in this form of construction, may be recessed or slotted accordingly.

The bulkheads 4 run between the adjacent ends of the sections 5a of the bulkheads 5, as the latter appear in Figure 6, though the bulkheads 4 are omitted in this view. Each unit or hull I may have the number of bulkheads 4 required. In Figures 1, 2, 4, 6, 9 and 10, five are shown; one at the center and two at each side; while in Figures 12 and 16, seven such bulkheads are illustrated.

The bulkheads 4 are shown recessed on their upper and lower edges (Figures 3 and 5) near the ends of the center section 4a, to receive the timbers 20 of the beams of the bulkheads 5 where these beams cross the tops and bottoms of the bulkheads 4. Also, the sections 4a and 4b have additional recesses at the upper and lower ends of the posts 16 for timbers 10 of the chords of the trusses 8 along both sides of the longitudinal bulkheads 5; and the planking 15 may have small slots also at the inner ends of said additional recesses beside the ends of posts 16 for the edges of the plates to enter. The chords or beams made up of the timbers 10 are similar to those containing the timbers 20 and may be in jointed parts or sections or one piece; and carry pairs of plates of the same sizes and shapes and in the same positions.

Between the bulkheads 4, the parallel lines of posts 7 are installed with their ends engaging the deck and bottom timbers 10. These posts are also arranged in rows parallel to the longitudinal bulkheads 4, and to each of these rows of posts 7, at top and bottom, the clamping stringers or planks 9 are made fast. (See Figure 11.) These rows of posts are in the planes of the reinforcing members 16 of the bulkheads 5; and the stringers 9 extend between the two bulkheads 5, and between said bulkheads and the longer sides of each unit; they are made fast to the vertical reinforcements 16 on the bulkheads 5. (See Figure 11.) The pairs of plates mounted in all the timbers 10 and 20 have perforated outer corners for attachment of the diagonal brace rods 11. Pairs of these braces 11, in crossed position, are at both sides of all the bulkheads 4, running along both faces of the bulkheads 5, and slantwise across the upright reinforcements 16 of the latter. Similar pairs of crossed brace rods are anchored to the pairs of plates in the timbers 10, for all of the bulkheads 4, and go across opposite faces of the posts 7, between the upper and lower timbers 10. Thus, the trusses 8 are made up.

The braces 11 are made taut by turnbuckles shown at 11a in Figure 12 to keep the timbers 10 tight and compress between the top and bottom timbers the reinforcing members 16 and posts 7. Thus, a light framework for the hull, but of great strength, is obtained. Both the bulkheads 5 and trusses 8 form in effect truss or latticed girders.

The outside plank covering 34 is laid on the bottom timbers 10 and 20, and the posts 17 at the sides and ends; also on the top timbers between the wing walls 2 to provide the deck or floor of the hull I.

The timbers and other members for the walls 2 are shown assembled to form separately upper wall sections 2a and lower wall sections 2b for each unit. These sections are fixed together and secured in place on the ends of the hull I. The vertical framing for these sections comprises two lines of uprights 22 and 23 for the inside and outside faces respectively of the top sections 2a; and, uprights 24 and 25 for the same faces respectively of the lower sections 2b. These uprights, with the bracing 12, 13 and 14 form perpendicular trusses in the same planes as the transverse trusses 8 in the hull, and the wing wall bulkheads 6 are, as already stated, in the same planes as the transverse bulkheads 5 in the hull I. The uprights at the ends of the wing wall sections, 22a and 23a on the inner and outer faces respectively of the upper sections 2a; and 24a and 25a for the same corners respectively of the lower sections 2b, are preferably heavy and each in one piece. The outside planking is secured to all these uprights from the tops of the walls down to the deck or floor of the hull. These corner uprights will lie approximately in the planes of the trusses 8 nearest to the longer sides of the hull. The lower corner uprights are attached to the framework of the hull in a manner that will be set forth clearly in connection with Figures 12, 18 and 19.

Figures 12 to 44 inclusive show a dock built as outlined in Figures 1 to 11; but designed more fully and completely illustrated in all details.

The upper sections 2a of the wing portions are built with single uprights 22 and 23, in line at a number of points between the longer ends; but the braces 13 and 14 are all used in pairs, attached at their ends to the uprights 22 and 23. (See Figures 7, 9, 10, 12, 13, 14, 15 and 17.) The lower sections 2b are constructed with the uprights 24 and 25 in pairs, with the crosspieces 14 used singly and clamped at their ends between the double uprights 24 and 25. The diagonal cross-braces 12 are secured against opposite sides of the braces 14. These latter braces at the tops of the lower sections 2b are just below the upper ends of the uprights 24 and 25 when the two sections are in place. Each pair of uprights 24 can receive between their upper ends the lower end of an upright 22; and so with each upright 23 and each pair of uprights 25. The top uprights rest at their lower ends upon the top cross pieces 14 of the sections 2b and the lowest cross pieces 14 of the upper wall sections rest upon the upper ends of the members 24 and 25, and the uprights 22, 23, 24 and 25 in the walls are united by bolts and splice plates 2c. (See Figures 13, 14 and 15.) The lower parts of the uprights 24 and 25 of each pair straddle the deck timbers 10 and 20 passing across the hull, and are secured thereto; while the lower extremities of the timbers 25 are affixed to the adjacent ends of the bottom chords comprising timbers 10 and 20; as indicated at the lower outer corner in Figure 13, in a fashion more fully described later; and the lower extremities of the uprights 24 are also attached to the bottom beams, and to opposite sides of adjacent upright reinforcements 16a on the near side of the closest bulkhead 4.

Adjacent the inner and outer sides of the wall portions, each of the lower sections 2b is trussed along its length from the floor of the dock up to the section 2a above it. The trusses 8' are made of chords or beams comprising upper and lower timbers 26 and diagonal crossed metal brace rods 11', having turnbuckles 11a for tightening. The timbers 26 are in sections, connected at the bulkheads 6, or between them; although in Figures 7 and 8 these beams appear in one piece only throughout their length. The planking 15' for these bulkheads can extend upward continuously from the timbers 20 of the bulkheads 5 to the tops of the walls 2. Each timber 26 is lined with thinner side timbers 26' on both faces; which may overlap the joints between the timbers 26. Between the timbers 26 and the side liners or fillers 26' are plates 21 at the bulkheads 6 and plates 21c at the extreme ends of these beams, all made fast. The planking at the bulkheads 6, when the chords are jointed thereat, is slotted for the plates 21, which project from both faces of the bulkheads 6; otherwise the planks are further recessed for the chords to pass through; and to the timbers and liners are securely bolted the plates 21 and 21c. The plates are perforated at the corners, and the ends of the brace rods 11' are attached thereto. As seen clearly in Figures 6, 9, 10, 13, 16 and 17, the lower truss girder timbers rest on and are affixed to the upper timbers of the dock framework, and the upper chords are laid on the top cross-pieces 14 of the lower sections 2b. The braces 11' and the metal plates 21 and 21c are in a double line to make up each truss 8', uniting each lower chord to the chord in the same vertical plane above it. In Figure 13, bolts are indicated at 27 to hold the upper chords, uprights and crosspieces 14 together, and secure the sections 2a and 2b together; and to secure the lowermost crosspieces and lower chords to the deck beams. These and other bolts and additional fastening devices of any suitable kind are used wherever necessary to secure parts in place.

Figures 12 to 19 show the construction of a dock unit, with at least seven bulkheads 4, and with five truss girders 8 between the bulkheads 5, and four more between the bulkheads 5 and the sides of said unit. In this example, the timbers 10 and 20 are only parts of upper and lower chords for the trusses 8 and bulkheads 5; they have planks or liners 10' securely attached along each side; and between the timbers, and the liners, the anchor plates for the braces 11 are bolted or otherwise fixed in position. The side planks 10' are united to the timbers 10 and 20 by bolts 10d or other means at suitable points. (See Figures 12 and 20.) Thus, the top and bottom chords are made up of central timbers and lining planks along both their sides; and the anchor plates for braces 11.

The pairs of uprights 24 and 25 in the planes of the trusses 8, with the members of each pair spaced apart as far as the thickness of the timbers 10, lie in the planes of the liners 10' on the timbers 10. They straddle the upper timbers 10; and the side planks 10' for these upper timbers terminate short of the outer ends thereof; and are interrupted adjacent the nearest bulkhead 4, to enable each pair of these uprights to pass the upper chords on each side with the timbers 10 snug between them. See Figure 13, illustrating one side plank 10' extending from the inner edge of the upright 25 (shown as broken out) as far as the near edge of the opposite upright 24 (also shown broken out), and beginning again at the other edge of this upright 24.

Figure 17 also shows that, near where the brace rods 11' in the wall trusses intersect, there may have to be two middle cross-pieces 14a instead of a single one 14 to enable the rods to pass. At their lower bevelled ends the uprights 25 engage the bevelled ends of the liners 10' of the bottom chords; and the ends of the lower timbers 10 lie between the ends of these uprights. At the lower extremities the uprights 24 are attached to the nearest bulkhead 4; secured to the opposite faces of a thick upright reinforcement 16a thereon, and attached to the adjacent bottom chord plates 21.

At the bulkheads 5 and 6, the wall framing is different. Each wall bulkhead 6 has vertical stringers 23' attached to its opposite faces along the outer sides of the walls 2 in the upper wall sections 2a; and these are in line with similar stringers 25' in the lower sections 2b of said walls. The stringers 23' extend from the top of the walls down to the level of the tops of the upper crossbars 14 of the lower sections; and there they are spliced by members 2c, to the stringers 25', which go down to the top timbers 20 of the bulkheads 5. To the outer faces of the stringers 25', above said timbers 20, are bolted fillers 26a, and splice members 25b, the former of which are above the timbers 20 and the latter of which go down past said timbers 20 and side pieces 10' on top of bulkheads 5 to the upper edges of the lower plates 21b of the trusses 8. The members 25b thus straddle the upper chords and the end posts 17 of the bulkheads 5 in the hull; and longer fillers 26b lie between the members 25b and said end posts. The latter are rabbeted as illustrated in Figures 17 and 17a above plates 21b to fit at their lower ends between the planking and said plates; and over the plates 21b are secured blocks 47 abutting the bevelled ends of the bottom planks 10'; fitting into the rabbeted ends of the posts 17 and further abutting the lower extremities of the fillers 26b and members 25b. The upper ends of the posts 17 can be recessed for the plates 21b.

The framing for the faces of the bulkheads 6 along the inner sides of the walls is similar. Vertical stringers of the same length as 23' are used in the top sections 2a; connected by splice members to stringers 24' (Figure 16) in the bottom sections 2b that run down to the chords along the tops of the adjacent bulkheads 5. Here they are connected by fillers like the fillers 26a; splice members 25b and longer fillers such as 26b (Figure 16) as thick as necessary, running along the faces of the planking of the bulkheads 5 and made fast thereto. The fillers and splice members may be bevelled along one edge like the members 24 at the bottom in Figure 13 to fit against the timbers 16 engaging the adjacent bulkhead 4 and be secured thereto.

Along the ends of each hull unit from one side wall to the opposite one, the string pieces 9 running below the deck timbers 10 and 20, and side timbers 10', and above the same timbers on the bottom, have vertical posts 9b between their ends (Figure 17) standing between the top and bottom chords of the adjacent trusses, and offset from the inside liners 10'. One or more liners or fillers 29 and fillers 31 stand between these posts and the outside planking. Posts 17a and 17b are attached to the extremities of the bulkheads 4 (between the side walls), the former to engage the outside planking, and the latter having an intervening filler 29'. Along the tops and bottoms of the posts 9b are beams 30 with seats or recesses in their outer faces for the ends of the outside fillers 31. The vertical fillers 29 are between the beams 30.

The corner uprights of the wall sections for each dock unit shown for example in Figures 6, 16 and 17, consist of relatively heavy timbers 25a running from the bottom of the hull to the tops of the walls. Rabbeted on one face at its lower end 32 (Figure 18) to fit the adjacent timbers 10', they rise to the top of the lower wall sections 2b; the side plank 10' of the adjacent deck chord being shortened as in Figure 13, so that this upright may be in contact with the side of the adjacent timber 10. At their upper ends they are jointed with splice plates or planks or in any suitable manner to continue to the tops of the side walls 2. They may also be braced with cross-pieces as required. Fillers or liners 31 cover the timbers 25a on their outer faces, standing between the timbers 30. The uprights 24a are at the inner corners of the walls 2; fitted in place and secured in the same way; and attached at the lower ends to the extremities of the adjacent bulkheads 4, in a manner similar to the timbers 24 (Figure 13).

Between the ends of the upper and lower chords or beams 26 for the truss chords in the side walls 2 are heavy uprights 9a (Figures 16 and 17) which extend from one chord to the other, and are secured between plates 21c in any suitable way. Between these uprights 9a and close to each are heavy timber columns 33, which extend from the deck timbers in the floor of the dock to the top of the side walls 2. They may be jointed at the upper truss chords if desired, or they may be in one piece; and are faced throughout their whole length with fillers 29b to which the planking is attached for the ends of the wall sections. At the tops of the wall sections joists 14a are laid upon the cross-pieces 14 for the top planking. Similar uprights 9a are attached to both faces of the bulkheads 6, as indicated in Figure 16; their ends again abutting the beams 26.

The uprights 24a and 25a are fitted and secured in any suitable fashion to the deck and bottom corner beams 30. The latter may be in lengths or sections, connected as required.

To facilitate the handling and fastening of the planking 34, panels are made up (Figure 17b) several planks each in width. Between the planks are tongues or splines of wood set in grooves, to give a leakproof joint. The panels are crossed by battens 36, secured to each of the planks by bolts and nuts indicated at 37; and the panels are further strengthened and stiffened by transverse rods 38 running through the planks from side to side, in bores enlarged at the ends to receive washers and binding nuts. The panels are laid on the framework so that the battens are in the spaces between the bulkheads and trusses. When the panels are laid they are connected by wedge strips 39. The sides and ends of the panels are bevelled to fit. Bolts 40 pass through these strips and large washers 41 engage the inner faces of the panels, and are made fast by nuts which secure the strips in place. The splines 35 may be used for the planks of the central bulkhead 4 also to make this bulkhead water-tight.

Each hull has corner logs 42 at each shorter side along the bottom. These logs are flanked by bottom logs 44 and side logs 43, united at the edges by spline pieces 35 set in grooves to give a tight joint. Bolts 45 pass through the corner, side and bottom logs to bind them together; and in the planes of the truss girders 8 the bottom and side logs are affixed by similar bolts 45a to the side planks or timbers 10' of the bottom chords and wing uprights 25 respectively. These planks 10' and uprights have their ends meeting in abutting bevelled engagement.

Long bolts 46 pass diagonally through the bevelled ends of the middle timbers 10 lying between the side planks 10', and the corner logs 42. These middle timbers have their ends between the lower ends of uprights 25, as already described in connection with Figure 13; Figure 21 being broken out to show this. The sides and bottom logs make a snug fit with the adjacent edges of the planking, being shaped to engage wedge strips 39 in the planking 34 as above described.

Where the bulkheads 5 are built, the planking 15 thereof is crossed by the upright end posts 17 above mentioned. Their lower ends are rabbeted as set forth above in connection with Figures 17 and 17a, and against these rabbeted ends are bolted the filler blocks 47 which are clamped against plates 46. These blocks have bevelled lower ends which straddle the timbers 20; and which abut the bevelled ends of the side planks 10'. At their upper ends the blocks 47 abut the lower ends of fillers 26b and splice members 25b. The blocks 47 are also bolted at 45a to the side planks 43.

At their extremities the corner logs have intervening separators 48 in grooves, to make tight joints and are connected by splicers 49. The splicers are pieces of timber with bevelled sides and the corners at the sides cut off to give bearing surfaces for nuts on bolts 45b to secure the splicers in position to the corner log. These bolts pass through both the horizontal surfaces of the bottom logs; and the vertical surfaces thereof; and additional bolts 46a run through these members from the corners of the logs 42.

The bottom logs 44 and side logs 43 are also connected at their ends along the sides of the hulls by wooden splicers 49a held in place by bolts 45c. Between the ends of these logs are separators 50.

The couplings 3 for the dock units embrace complementary parts, one of which 3a is mounted on one end of a length of wall upon one hull, and the other 3b upon the opposing end of a length of side wall of the adjacent hull. The member 3a forms the head member of the coupling; the other 3b, the socket member by which the head is held. In operation the head members are permitted to slide up and down in the socket members as the couplings hold the dock units together. Thus, the dock units, in sinking, raising and trimming can be managed and controlled independently of one another. If one unit is pumped out or filled more rapidly than the next, no stress on the couplings ensues because the units are allowed to rise or sink to some extent independently. When this happens the pumps are slowed or accelerated, to bring all units into proper position, that is, to the same level.

In structure the head member comprises vertical I-beams 51, extending from the floor of the dock upward along the end of a length of wall 2. They are affixed by welding their flanges to intervening space plates or shims 52 which are welded to the plates 21c projecting out at the extremities of the upper and lower chords of the wall trusses 8'; the ends of beams 51 being between the plates 21c. At their lower ends these beams are joined by a horizontal beam 53 welded in place; through similar intervening plates or shims; which are shown in Figures 26 and 27 but are omitted from Figures 28, 29 and 30 for the sake of clearness; and higher up but at a distance below the upper ends of the beams 51 is a cross-beam 54. This cross-beam is fitted to the beams 51 and attached thereto at its ends by bolts and angle irons indicated at 55, engaging the webs of the two beams; and can easily be put into place and removed. The web of the beam 54 can be extended beyond the flanges by cutting away the latter, for this purpose. The two horizontal beams 53 and 54 are connected by vertical beams 56 in the space between the beams 51, also removably attached at upper and lower ends by bolts and angle members 55. To the beams 56 the head 57 is affixed. It projects outward beyond the faces of the beams 56; and is retained by the socket member 3b, when the couplings connect the dock units together.

The socket member also comprises vertical beams 51 mounted in the same position on the end of the wall of the next unit, at the same side, and connected as before, and at the same points, by horizontal beams 53 and 54, the latter again being removably attached by bolts and angles 55; and the former permanently secured in place. In the space between these beams 51, the beams 53 and 54 are joined by flat beams 58, each consisting of a front flange 58a and back flange 58b, united by two webs 59. The webs 59 are cut or rabbeted at their lower ends to fit upon the top flanges of the beams 53 and are welded thereto; at their tops the beams 58 are detachably joined to beam 54 by bolts and angle irons 55 attached to the webs 59. Near their tops the beams 58 are braced by short lengths of I-beams 65 welded to the outer webs 59 at one end and at the other to T-plates 66 welded in turn to the beams 51. The inside webs 58b are spanned by a plate 64 welded on behind them at the level of the members 65. The beams 58 are further joined by two cross-beams 61, just below the plate 64 and above the beam 53, with plates 62 welded on their ends to be bolted at 63 to the inner webs 59 (Figures 31 and 32), so that these beams 61 can be readily dismounted. Between the horizontal beams 61 the flanges 58a and 58b are wider, extending over the inside webs 59, so as to overlap and engage the projecting ends of the head 57. The webs 59 taper to shorter width at top and bottom and the flanges 58a have sloping portions 60. The beams 58 and inner webs 59 form vertical guideways for the head 57.

The head 57 may be hollow and made up of metal plates forming front and rear faces 66, top and bottom faces 67, and ends 68. Inside are vertical reinforcing webs 69, parallel to the ends, and inside horizontal reinforcing bars or webs 70 connecting the webs and ends. Upon the front and rear faces adjacent the ends are convex reinforcing bars 71. Bars or webs 72 welded to the head and beams 56 hold the head in position. These webs 72 are not so far apart as the ends of the head, which are thus in effect transversely extended.

To connect the units of the dock, as appears in Figure 44, the beams 54 of the socket members 3b are unbolted and dismounted; so are the upper beams 61. One unit is then partly flooded and lowered sufficiently in the water. The next section is brought near enough to locate the heads 3a between the beams 51 of the sockets, in line with the spaces above the beams 58. The one unit can now be pumped out and raised or the other lowered until the heads 57 drop between the beams 58, with the ends 68 between the front beams 58a at their widest parts. Beams 54 and 61 are then bolted into place again. The units are then coupled but the heads 3a can slide up and down in the members 3b.

The units can also be connected simply by moving them close together with the beams 54 and 61 of the members 3b, and the heads 57, beams 56 and associated cross-beams 54 removed. The heads 57 can be engaged with the socket guideways, and the said beams then securely attached in proper positions.

In Figures 36, 37 and 38 the diagonal brace rods for the trusses 8' in the wing walls are shown. The rods are attached to the plates 21, etc., by pins 73. At the points of intersection, one pair of rods always passes between those of the other pair. The inner rods are pinned to the inner faces of the plates and the others are affixed to the outer faces.

The brace rods for the trusses 8 of the hulls (Figures 39, 40 and 41) are all pinned to the outer faces of the anchor plates 21a, 21b, etc., at the corners. The brace rods of one-half of the pairs are made in sections 11a and 11b, each joined at the point of intersection by two separate splice plates 74. Between the two splice plates at each junction, the remaining rods pass. Hence, in the trusses 8, all the brace rods attached to one line of plates can be virtually in the same plane. The same arrangement is also followed for both faces of the bulkheads 5.

The detail presented in Figures 42 and 43 shows a type of truss plate 21 with a flange 21'. The plate is used as already described; being secured between the timbers 10 and 20, and the fillers or liners 10'. These parts are recessed for the flanges 21' so that the latter are flush with the faces of the chords. The edge opposite the flange has a recess as shown at 21', deep enough to reach the adjacent face of the chord. The top and bottom of the bulkhead 4 enters this recess, and the planks 15 do not have to be provided with transverse slots thereat to receive the plate. The vertical posts 16 lie between the plates of each pair as before. A plate of this form is advantageous for use in connection with the central bulkhead 4, which is watertight; but it can be employed with the other bulkheads 4 if desired.

The dock above described can therefore not only be set up easily and quickly when it is needed; but also the units can be rapidly knocked down and removed for use elsewhere. The design is such that the parts can all be secured to place by bolts and nuts. Hence, no other tools are required, but suitable lifting apparatus, wrenches and spanners, to put the various parts in position and make them secure; and to unfasten and disassemble the various members afterward. In practice, the wings are usually disconnected from the hull and separated into the upper and lower sections which are of the right size to be hoisted, lowered or shipped very handily; but the hulls or pontoon units must be managed by stripping off the planking, corner logs, etc.; disconnecting the brace rods, dismounting the deck and bottom chords and even taking these apart, and dismantling the bulkheads till only the sections are left, to be stored or transported. The whole dock can just as easily be rebuilt and again put into service.

The planking or outer covering takes no stresses except water pressure. All docking stresses are borne by the framework in the wings and hull, i. e., the bulkheads, chords and trusses, independently of the outside plank covering.

The above-described framework can be utilized equally well for a dock consisting of one large hull with walls along the sides, instead of a hull and walls made up of units with sections of walls at each end, and joined together, as set forth herein; and the terms "hull" and "side walls" shall be construed in this broad sense.

Having described my invention, what I believe to be new is:

1. A floating dry dock pontoon hull having walls thereon, each of said walls consisting of an upper and a lower section, said sections containing uprights which have interfitting engagement at their adjoining ends.

2. A floating dry dock pontoon hull having walls thereon, each of said walls consisting of an upper and a lower section, the latter containing trusses along both faces from end to end, said sections including uprights which have interfitting engagement at the top of the lower section and the bottom of the upper section.

3. A floating dry dock pontoon hull having walls thereon, each of said walls consisting of an upper section and a lower section, the one section containing single uprights and the other paired uprights which receive the ends of the single uprights between them.

4. A floating dry dock pontoon hull having walls thereon, each of said walls consisting of an upper and a lower section, the one section containing single uprights and the other paired uprights receiving the ends of the single uprights between them, said uprights having horizontal cross-braces, the ends of the uprights of each section abutting the adjacent cross-braces of the other section.

5. The dry dock hull, according to claim 4, wherein the lower section has an inside truss extending from end to end along both the inner and outer faces of same.

6. A floating dry dock pontoon hull having a trussed framework therein and walls thereon, each wall consisting of an upper and a lower section, each of which comprises two lines of uprights, said uprights extending from end to end along the opposite faces of said walls, the uprights of said sections interfitting at their adjoining ends, and trusses in the lower section extending from end to end along both lines of uprights therein.

7. A floating dry dock pontoon hull having a wall at each side, bulkheads in the pontoon extending from side to side, trussed chords extending along the tops and bottoms of said bulkheads, additional bulkheads intersecting said bulkheads, and trussed chords crossing the tops and bottoms of said additional bulkheads at intervals throughout the length of the latter.

8. A floating dry dock pontoon hull having walls at each side, each wall having a chord therein at the level of the deck of the pontoon, said chords extending substantially adjacent and parallel to the opposite faces of the walls and from end to end thereof, a second chord above each of the first and parallel therewith between said ends, diagonal braces connecting each of said chords at the level of the deck to the chord above it, bulkheads in the pontoon extending from side to side, trussed chords extending along the tops and bottoms of said bulkheads, additional bulkheads intersecting the aforesaid bulkheads, and trussed chords crossing the tops and bottoms of said additional bulkheads at intervals throughout the length of the latter.

9. A floating dry dock pontoon hull having walls at each side, each wall containing a line of uprights along each face thereof, deck and bottom beams extending from side to side in the hull engaging said uprights, chords on said deck beams inside said walls, one chord lying adjacent each line of uprights and parallel therewith, horizontal cross-pieces on top of said chords and engaging the lines of uprights at the ends of said cross-pieces, a chord above each chord on said deck beams and parallel thereto, horizontal cross-pieces extending across the top and bottom of the upper chords and joined at their opposite ends to said uprights and diagonal brace rods connecting each lower chord to the chord above it.

10. The floating dry dock pontoon of claim 9, wherein said walls also have inside diagonal braces extending between said upper and lower chords and the cross-pieces therefor.

11. A floating dry dock pontoon having walls at each side, each wall containing a line of uprights extending from end to end along each face, deck and bottom beams extending from side to side in the hull, the uprights in the lower parts of said walls comprising paired members which receive the deck beams between them and pass down to the bottom members.

12. A floating dry dock hull having a wall at each side, each wall comprising an upper and lower section, said sections containing a line of uprights along each inner and outer face, the uprights of the upper section comprising single members and those of the lower section paired members which receive the ends of said single members between them, horizontal cross-arms between said paired members at their tops and extending from one line to the other to engage the lower ends of said single members, and horizontal cross-arms at both sides of said single members, running from one line to the other in position to rest upon the tops of said paired members.

13. A floating dry dock hull having one or more bulkheads therein, top and bottom chords for each said bulkhead, anchor plates in pairs secured to said chords along the length thereof, the plates of the several pairs receiving the top and bottom of the bulkhead between them, and diagonal truss rods on each face of said bulkhead connecting the plates on that face together.

14. A floating dry dock hull having truss girders therein, each of said girders comprising a top and a bottom chord made up of a relatively thick central member, thinner members secured to each side of said central member, and anchor plates between said central and side members at intervals along the length of said chords.

15. A floating dry dock hull having bulkheads extending from side to side therein, the said bulkheads consisting of sections of substantially equal length, additional bulkheads intersecting the first-named bulkheads and passing between the ends of adjacent sections thereof, the additional bulkheads also being made in sections, one of which is longer than the space between said first-named bulkheads, the latter being secured to said longer sections adjacent the extremities thereof, the other sections of the additional bulkheads being affixed to the extremities of the longer sections.

16. A floating dry dock hull having bulkheads therein, deck and bottom chords crossing said bulkheads, anchor plates fixed to said chords adjacent said bulkheads, said plates projecting from said chords towards the bulkheads, some of the plates having recesses for the top and bottom of a bulkhead, and brace rods connecting said plates.

17. A floating dry dock hull having bulkheads extending from side to side, said bulkheads comprising sections with vertical reinforcing posts at the ends, deck and bottom chords at the top and bottom of said bulkheads, additional bulkheads intersecting the aforesaid bulkheads and passing between the sections thereof, anchor plates fixed to said chords adjacent said additional bulkheads, and projecting from said chords out over the first-named bulkheads, some of said plates having recesses in one edge for the top and bottom of an additional bulkhead, the plates having flanges at their opposite edges to secure them to the chords.

18. A floating dry dock hull having truss girders, each comprising a deck and bottom chord, anchor plates secured to said chords and arranged in pairs, and crossed diagonal brace rods connecting the plates of the deck chords to those of the bottom chords, some of said rods being bolted to the inner faces of said plates and some to the outer faces, so that at each intersection one pair of rods passes within another pair.

19. A floating dry dock hull having side walls thereon, parallel truss girders within said walls extending from end to end thereof, and external coupling members attached to the ends of said girders.

20. A floating dry dock hull having walls thereon, a pair of lower chords and a pair of upper chords therein, plates attached to the ends of said chords and projecting from said ends, external upright beams attached to said plates, and a coupling member affixed to said beams.

21. A floating dry dock hull having truss girders comprising upper and lower chords, anchor plates attached to chords at intervals along their length, said plates being arranged side by side in pairs, diagonal crossed brace rods uniting the plates of the upper chords to the plates of the lowers, some of said rods being in two parts with their adjacent ends separated, each of said parts being connected to the associated part by a pair of outside links, leaving a space through which one of the remaining rods passes at each intersection.

22. A floating dry dock hull comprising a side wall and a coupling member made of a pair of vertical beams affixed to said wall, horizontal beams, one above the other, connecting said vertical beams, the upper horizontal beam being detachably secured in place, and means forming a pair of vertical guideways supported at their upper and lower ends between said vertical beams by said horizontal beams, the upper ends of said guideways and the upper horizontal beam being detachably secured to each other.

23. The floating dry dock according to claim 22, wherein the guideways each have a detachable closure member secured between them adjacent their upper ends, below the horizontal beam thereat.

24. A floating dry dock, comprising hull and side walls, said hull having an inside framework including bulkheads made up of sections connected together, and said walls embracing a lower section attached to the hull, and an upper section having interfitting engagement with said lower section.

25. A floating dry dock, comprising hull and side walls, each of said walls made up of a lower section and an attached upper section, the hull containing an inside framework including intersecting bulkheads, all in sections, some of said bulkheads being affixed to a single section in each of the remaining bulkheads.

26. A floating dry dock, comprising hull and side walls, the hull containing a framework having deck and bottom chords extending from one wall to the other, the walls including uprights which have interfitting engagement with said chords.

FREDERIC R. HARRIS.